United States Patent
Yang et al.

(10) Patent No.: US 12,425,406 B2
(45) Date of Patent: Sep. 23, 2025

(54) PROCESSING METHOD AND AN ELECTRONIC EQUIPMENT FOR SECURELY ACCESSING ROAMING RESOURCES

(71) Applicant: Hangzhou Jindoutengyun Technologies Co., Ltd., Hangzhou (CN)

(72) Inventors: Yang Yang, Hangzhou (CN); Kai Chen, Hangzhou (CN); Jie Ding, Hangzhou (CN)

(73) Assignee: Hangzhou Jindoutengyun Technologies Co., Ltd., Hangzhou (CN)

( * ) Notice: Subject to any disclaimer, the term of this patent is extended or adjusted under 35 U.S.C. 154(b) by 0 days.

(21) Appl. No.: 18/632,297

(22) Filed: Apr. 11, 2024

(65) Prior Publication Data

US 2024/0372859 A1    Nov. 7, 2024

(30) Foreign Application Priority Data

May 6, 2023    (CN) .......................... 202310497991.8

(51) Int. Cl.
  *H04L 9/40*   (2022.01)
  *H04L 67/14*  (2022.01)

(52) U.S. Cl.
  CPC .............. *H04L 63/10* (2013.01); *H04L 67/14* (2013.01)

(58) Field of Classification Search
  CPC ..................................................... H04L 67/14
  See application file for complete search history.

(56) References Cited

U.S. PATENT DOCUMENTS

| | | | | |
|---|---|---|---|---|
| 7,035,921 B1* | 4/2006 | Baker | ................. | H04L 67/1029 709/227 |
| 8,443,435 B1* | 5/2013 | Schroeder | ............... | H04L 63/08 726/15 |
| 2002/0143773 A1* | 10/2002 | Spicer | ..................... | H04L 67/51 |
| 2006/0059565 A1* | 3/2006 | Green | ................... | H04L 47/822 726/27 |
| 2011/0022844 A1* | 1/2011 | Petillo | ...................... | H04L 63/18 713/170 |
| 2012/0166627 A1* | 6/2012 | Kraiman | ................. | H04L 43/12 709/224 |

(Continued)

*Primary Examiner* — Viet D Vu
(74) *Attorney, Agent, or Firm* — Proi Intellectual Property US

(57) ABSTRACT

A processing method for secure access to a resource access server connected to one or more resources by means of a resource client comprises: registering the resource and determining a resource identifier corresponding to the resource; receiving a resource confirm request carrying the resource identifier from the resource client; at least confirming that the resource identifier is valid, and in response to the resource confirm request, providing a resource access channel connection message to the resource client; receiving a resource access request of a user for accessing a target resource; in response to a resource access channel establishment request initiated by the resource client according to the resource access channel connection message, establishing a resource access channel between the resource access server and the resource client; and in response to the resource access request, allowing access to the target resource by means of the resource access channel.

16 Claims, 3 Drawing Sheets

(56) References Cited

U.S. PATENT DOCUMENTS

| | | | | |
|---|---|---|---|---|
| 2013/0268584 A1* | 10/2013 | Desai | ............... | H04L 67/00 |
| | | | | 709/203 |
| 2014/0165147 A1* | 6/2014 | Hershberg | ............ | H04L 63/083 |
| | | | | 726/4 |
| 2023/0254147 A1* | 8/2023 | Huo | ............... | H04L 9/3213 |
| | | | | 713/159 |

\* cited by examiner

PROCESSING METHOD AND AN ELECTRONIC EQUIPMENT FOR SECURELY ACCESSING ROAMING RESOURCES

BACKGROUND OF THE INVENTION

1. Technical Field

The invention relates to a processing method for secure access and electronic equipment.

2. Description of Related Art

In the prior art, the "NAT traversal" technique is often used to realize access to roaming resources (without a fixed address) or resources without an externally accessible address: a client is installed on a target resource and an access channel is established between the client and a server with a public access address. Because the access channel is established by the server upon a request of the client, it will be open all the time unless the client is disconnected from the server (for example, the client is closed).

The above technique has the defects that the access channel in the open state occupies a large number of resources and increases the security risk of the target resource.

BRIEF SUMMARY OF THE INVENTION

In view of the abovementioned problems, the objective of the invention is to provide a processing method for secure access to save resources and improve security.

The invention also provides electronic equipment.

To fulfill the above objective, the invention is implemented through the following technical solutions:

In one aspect of the invention, a processing method for secure access is applied to a resource access server, wherein the resource access server is connected to one or more resources by means of a resource client, and the processing method comprises:

registering the resource and determining a resource identifier corresponding to the resource;
  receiving a resource confirm request carrying the resource identifier from the resource client;
  at least confirming that the resource identifier is valid, and in response to the resource confirm request, providing a resource access channel connection message to the resource client;
  receiving a resource access request of a user for accessing a target resource;
  in response to a resource access channel establishment request initiated by the resource client according to the resource access channel connection message, establishing a resource access channel between the resource access server and the resource client; and
  in response to the resource access request, allowing access to the target resource by means of the resource access channel.

Preferably, the resource is a roaming resource without a fixed address or the resource does not have an externally accessible address.

Preferably, the resource access channel connection message is used for establishing one or more resource access channels to respond to one or more resource access requests to allow access to the target resource.

Preferably, the resource access channels are mutually isolated.

Preferably, the resource access channel connection message is with randomness.

Preferably, if the resource client does not receive a response to the resource access channel establishment request from the resource access server or the resource access server refuses to establish a resource access channel, the resource client periodically sends the resource access channel establishment request for establishing a resource access channel to the resource access server.

Preferably, the processing method further comprises:
  if the resource access request for accessing the target resource is not received, not responding to or rejecting the resource access channel establishment request for establishing a resource access channel initiated by the resource client according to the resource access channel connection message.

Preferably, the resource confirm request carrying the resource identifier from the resource client is sent periodically.

Preferably, the method further comprises: checking the validity of the resource access request to determine that the user has an access right to access the target resource.

Preferably, the method further comprises: closing the resource access channel at the end of a resource access request session.

In another aspect of the invention, a processing method for secure access is applied to a resource client, wherein the resource client carries or is able to access one or more resources and is connected to a resource access server, and the processing method comprises:

at least configuring an address of the resource access server and a resource identifier corresponding to the resource;
  initiating a resource confirm request carrying the resource identifier to the resource access server;
  receiving a resource access channel connection message from the resource access server;
  initiating, according to the resource access channel connection message, a resource access channel establishment request for establishing a resource access channel to the resource access server; and
  allowing a user to access a target resource by means of a resource access channel between the resource access server and the resource client;
  wherein, the resource access channel connection message is provided to the resource client after the resource access server at least confirms that the resource identifier is valid; the resource access channel is established in response to the resource access channel establishment request after the resource access server receives a resource access request for accessing the target resource.

Preferably, the resource is a roaming resource without a fixed address or the resource does not have an externally accessible address.

Preferably, the resource access channel connection message is used for establishing one or more resource access channels to respond to one or more resource access requests to allow access to the target resource.

Preferably, the resource access channels are mutually isolated.

Preferably, the resource access channel connection message is with randomness.

Preferably, the processing method further comprises:
  if a response to the resource access channel establishment request is not received from the resource access server or the resource access server refuses to establish a resource access channel, periodically sending the resource access channel establishment request for establishing a resource access channel to the resource access server.

Preferably, the resource client periodically initiates the resource confirm request carrying the resource identifier to the resource access server.

Preferably, if not receiving the resource access request for accessing the target resource, the resource access server will not respond to or will reject the resource access channel establishment request from the resource client.

In another aspect of the invention, electronic equipment comprises: a memory and a processor which are in communication connection, and a computer program which is stored in the memory and is able to run on the processor, wherein the processing method described above is implemented when the computer program runs on the processor.

The invention has the following beneficial effects:

1. According to the invention, after the resource access server receives a resource access request for accessing a target resource, a resource access channel between the resource access server and the resource client is established in response to a resource access channel establishment request, that is, the resource access channel will be established according to the request from the resource client only when the resource access server receives a valid access request for accessing the target resource. In this way, the security is better, and resources can be saved; different from the prior art that the resource access channel is always present no matter whether there exists an access request, the resource access channel will not be established until the valid access request for accessing the target resource is received, such that resources are neither occupied nor exposed.

2. The establishment of the access channel is divided into two stages: resource confirmation and channel establishment. At the resource confirmation stage, the resource access server receives a resource confirm request carrying the resource identifier from the resource client, and provides a resource access channel connection message to the resource client after at least confirming that the resource identifier is valid; at the channel establishment stage, the resource access server establishes a resource access channel between the resource access server and the resource client in response to a resource access channel establishment request initiated according to the resource access channel connection message. In this way, because the establishment of the resource access channel is related to the resource access channel connection message, the resource access channel connection message is introduced in the resource confirmation stage, and one or more resource access channels can be established by setting the resource access channel connection message (for example, multiple resource access channel codes are provided by the resource access channel connection message, and at the channel establishment stage, multiple resource access channels are established respectively according to the multiple resource access channel codes; or, multiple connection messages are provided according to the request, and multiple resource access channels are established respectively according to the multiple connection messages; or, one connection message is provided according to the request, and one resource access channel is established according to the resource access channel connection message), such that the flexibility is better.

3. The resource access channel connection message is introduced at the resource confirmation stage, and one or more resource access channels can be established by setting the resource access channel connection message. In this way, in the presence of multiple resource access requests for accessing the same resource, multiple mutually isolated resource access channels can be established, thus improving security. In addition, access sources can be controlled by means of the resource access channel.

4. The resource access channel connection message is introduced at the resource confirmation stage, and the resource access channel connection message is with randomness, for example, the resource access channel connection message is randomly generated or allocated by the resource access server. In this way, the resource access channel established according to the resource access channel connection message is also with randomness and can prevent reuse or damage, thus being better in security; if the resource access channel connection message is not introduced, the resource access channel has to be established by means of the fixed resource identifiers.

5. By adopting the technical solution of the invention, users can more securely access roaming resources without a fixed address and resources without an externally accessible address.

DETAILED DESCRIPTION OF THE INVENTION

Figure 1:
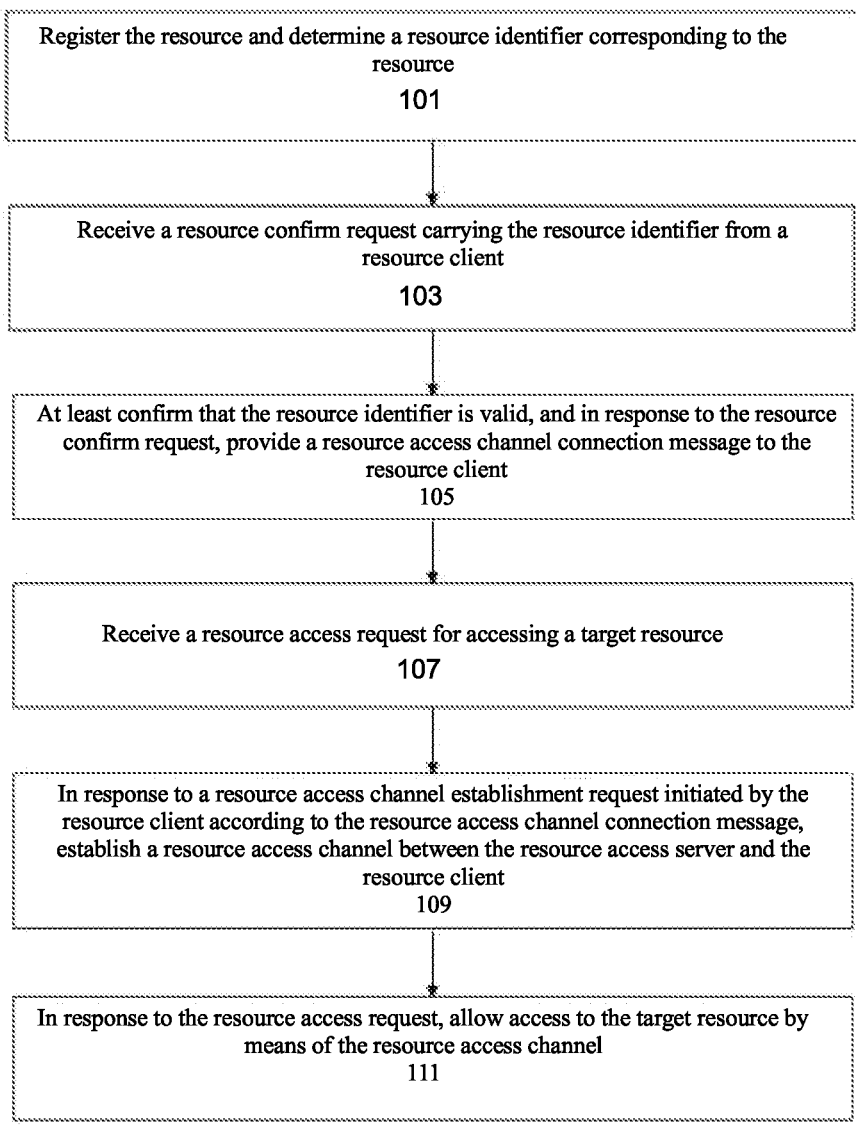
FIG. 1 is a flow diagram of one processing method for secure access according to the invention.

To better clarify the objectives, technical solutions and advantages of the embodiments of the invention, the technical solutions of the embodiments of the invention will be clearly and completely described. Obviously, the embodiments in the following description are merely illustrative ones, and are not all possible ones of the invention. All other embodiments obtained by those ordinarily skilled in the art based on the following ones without creative labor should also fall within the protection scope of the invention.

In the following illustrative embodiments of the invention, roaming resources without a fixed address and resources without an externally accessible address can be accessed more securely. Specifically, when a resource access server receives a resource access request for accessing a target resource, a resource access channel between the resource access server and a resource client will be established in response to a resource access channel establishment request to allow access to the target resource by means of the resource access channel, that is, only when the resource access server receives a valid access request for accessing the target resource, a resource access channel will be established according to the request from the resource client. Compared with the prior art that the resource access channel is always present no matter whether there exists a valid access request, resources are saved, and the security is better; and the resource access channel will not be established until the valid access request for accessing the target resource is received, such that resources are neither occupied nor exposed.

In the illustrative embodiments, the resource access server may be an independent server or a server cluster. The server cluster is a server cluster or distributed system formed by multiple physical servers, or a cloud server capable of providing a cloud service, a cloud database, cloud computation, cloud functions, cloud storage, a network service, cloud communication, a middleware service, a domain name service, a security service, a CDN, a big data and artificial intelligent platform, and other basic cloud computing services. The resource client is a smart phone or other data communication devices that can exchange data with data networks or other electronic devices, and may be embodied as any suitable computing systems and/or devices, such as (illustrative rather than restrictive): desktop computers, portable computers, handheld portable computers such as personal digital assistants (PDA) and tablet personal computers, and wearable electronic devices such as smart phones, smart watches, head-mounted devices and earphones. The resource client carries or is able to access one or more resources and is equipped with an application for exchanging data with the resource access server, that is, the resource access server is connected to one or more resources by means of the resource client. The target resource is one or more of the resources. The resources are roaming resources without a fixed address or the resources do not have an externally accessible address. For example, the resources are documents or data stored on a portable computer, and the address of the portable computer varies with change of the location of users and is not fixed.

As shown in FIG. 1 which illustrates a processing method for secure access, the processing method is implemented by a resource access server and specifically comprises the following steps:

101, a resource is determined, and a resource identifier corresponding to the resource is determined.

Specifically, for each resource, a unique resource identifier corresponding to said resource is determined, and the resource identifier may be randomly generated by the resource access server, randomly allocated by the resource access server according to existing resource identifiers, or directly specified by the resource access server. Of course, within the optional range of those skilled in the art, methods for determining the resource identifier are not limited to those mentioned here.

103, a resource confirm request carrying the resource identifier from a resource client is received.

Specifically, after being configured, the resource client sends a resource confirm request carrying the resource identifier to the resource access server, and the resource access server receives the resource confirm request.

105, the resource identifier is valid is confirmed at least, and in response to the resource confirm request, a resource access channel connection message is provided to the resource client.

Specifically, after receiving the resource confirm request carrying the resource identifier from the resource client, the resource access server confirms whether the resource identifier is valid (for example, the resource access server determines whether the resource identifier is generated, allocated or specified by it); after at least confirming that the resource identifier is valid, the resource access server provides a resource access channel connection message to the resource client in response to the resource confirm request; otherwise, if confirming that the resource identifier is invalid (for example, the resource identifier is not generated, allocated or specified by the resource access server, and a resource corresponding to the resource identifier is not registered in the resource access server), the resource access server will not respond to or will reject the resource confirm request.

In some actual applications, those skilled in the art can set the handshake (the resource client sends the resource confirm request and the resource access server responds to the resource confirm request) as needed. For example, according to the resource confirm request, multiple resource access channel connection messages are provided to the resource clients to establish multiple resource access channels respectively according to the multiple resource access channel connection messages; or, according to the resource confirm request, one resource access channel connection message is provided to the resource client, the resource access channel connection message includes multiple resource access channel codes, and multiple resource access channels are established respectively according to the multiple resource access channel codes. That is, the resource access channel connection message is used for establishing one or more resource access channels to respond to one or more resource access requests to allow access to the target resource by means of the resource access channels. In this way, the resource access channel connection message can be adjusted and set according to actual use requirements, such that the flexibility is better. For example, multiple mutually isolated resource access channels can be established to allow multiple resource access requests to access multiple different resources respectively. In some preferred embodiments, in the presence of multiple resource access requests for accessing the same resource, multiple mutually isolated resource access channels can be established to allow multiple resource access requests to access the same resource by means of different resource access channels, such that the security is better. In addition, access sources can be controlled by means of the resource access channels. User A and user B both have an access right to access a resource a, user A initiates a request for accessing the resource a, and a resource access channel Aa is established. The resource access channel Aa may be set to only allow an access request from the address of user A, user B cannot directly access the resource a by means of the resource access channel Aa, and a resource access channel Ba needs to be established to allow user B to access the resource a. In this way, even if the access right of user B is not strictly managed or there is an error of the access right of user B, access of user B to the resource can still be controlled, thus further improving the security.

In some preferred embodiments, the resource access channel connection message is with randomness. For example, the resource access channel connection message is randomly generated or allocated by the resource access server. In this way, the resource access channel established according to the resource access channel connection message is also with randomness and can prevent reuse or damage, thus further improving the security.

107, a resource access request for accessing a target resource is received.

Specifically, a user requests to access a target resource by means of a terminal (such as a portable computer, a smart phone or a smart watch), and the resource access server receives the resource access request.

In some actual applications, after receiving the resource access request, the resource access server checks the validity of the resource access request, performs step 109 when confirming that the user has an access right to access the resource, or otherwise, directly rejects the access request. In this way, the access right is managed at the access request reception stage, thus further improving the security and processing efficiency.

109, in response to a resource access channel establishment request initiated by the resource client according to the resource access channel connection message, a resource access channel between the resource access server and the resource client is established.

Specifically, the resource access server responds to the resource access channel establishment channel only when receiving a valid access request for accessing the target resource, and establishes the resource access channel according to the resource access channel connection message in the request.

In some actual applications, the resource access server starts multiple resource access channel servers. For example, after confirming that a resource identifier corresponding to the resource a is valid, the resource access server provides three resource access channel connection messages (AAA, BBB and CCC which all correspond to the resource a) to the resource client; when receiving a resource access request for accessing the resource a from user A, the resource access server starts one resource access channel server; when receiving a resource access channel establishment request initiated by the resource client according to the resource access channel connection message AAA, the resource access server responds to the resource access channel establishment request and establishes a resource access channel between the resource access server and the resource client to allow user A to access the resource a by means of the resource access channel; when receiving a resource access request for accessing the resource a from user B, the resource access server starts a second resource access channel server; when receiving a resource access channel establishment request initiated by the resource client according to the resource access channel connection message BBB, the resource access server responds to the resource access channel establishment request and establishes a resource access channel between the resource access server and the resource client to allow user B to access the resource a by means of the resource access channel; when receiving a resource access request for accessing the resource a from user C, the resource access server starts a third resource access channel server; when receiving a resource access channel establishment request initiated by the resource client according to the resource access channel connection message CCC, the resource access server responds to the resource access channel establishment request and establishes a resource access channel between the resource access server and the resource client to allow user C to access the resource a by means of the resource access channel. For another example, after confirming that a resource identifier corresponding to the resource a is valid, the resource access server provides one resource access channel connection message to the resource client, and the resource access channel connection message includes three resource access channel codes AA, BB and CC, which all correspond to the resource a; when receiving a resource access request for accessing the resource a from user A, the resource access server starts one resource access channel server; when receiving a resource access channel establishment request initiated by the resource client according to the resource access channel code AA in the resource access channel connection message, the resource access server responds to the resource access channel establishment request and establishes a resource access channel between the resource access server and the resource client to allow user A to access the resource a by means of the resource access channel; when receiving a resource access request for accessing the resource a from user B, the resource access server starts a second resource access channel server; when receiving a resource access channel establishment request initiated by the resource client according to the resource access channel code BB in the resource access channel connection message, the resource access server responds to the resource access channel establishment request and establishes a resource access channel between the resource access server and the resource client to allow user B to access the resource a by means of the resource access channel; when receiving a resource access request for accessing the resource a from user C, the resource access server starts a third resource access channel server; when receiving a resource access channel establishment request initiated by the resource client according to the resource access channel code CC in the resource access channel connection message, the resource access server responds to the resource access channel establishment request and establishes a resource access channel between the resource access server and the resource client to allow user C to access the resource a by means of the resource access channel. These examples are merely illustrative descriptions for a good understanding of the technical solution of the invention, and are not intended to limit the invention. Within the optional range of those skilled in the art, the number of the resource access channel connection messages in these actual applications is at least two (such as two, four, five or six); in the case of one resource access channel connection message, the number of the resource access channel codes is at least two (such as two, four, five or six). In addition, when multiple resource access channels are established, the resource access channels may be established synchronously or sequentially as needed.

In some other actual applications, the resource access server starts one resource access channel server. For example, when confirming that a resource identifier corresponding to the resource a is valid, the resource access server provides three resource access channel connection messages (AAA, BBB and CCC which all correspond to the resource a) to the resource client; when receiving a resource access request for accessing the resource a from user A, the resource access server starts a resource access channel server; when receiving a resource access channel establishment request initiated by the resource client according to the resource access channel connection message AAA, the resource access server responds to the resource access channel establishment request and establishes a resource access channel between the resource access server and the resource client to allow user A to access the resource a by means of the resource access channel. Similarly, when receiving a resource access request for accessing the resource a from user B, the resource access server responds to a resource access channel establishment request initiated by the resource client according to the resource access channel connection message BBB and establishes a resource access channel between the resource access server and the resource client by means of the same resource access channel server to allow user B to access the resource a by means of the resource access channel. Similarly, when receiving a resource access request for accessing the resource a from user C, the resource access server responds to a resource access channel establishment request initiated by the resource client according to the resource access channel connection message CCC and establishes a resource access channel between the resource access server and the resource client by means of the same resource access channel server to allow user C to access the resource a by means of the second resource access channel. For another example, when confirming that a resource identifier corresponding to the resource a is valid, the resource access server provides a resource access channel connection message DDD to the resource client; when receiving a resource access request for accessing the resource a from user D, the resource access server starts a resource access channel server; when receiving a resource access channel establishment request initiated by the resource client according to the resource access channel connection message DDD, the resource access server responds to the resource access channel establishment request and establishes a resource access channel between the resource access server and the resource client to allow user D to access the resource a by means of the resource access channel. For another example, after confirming that a resource identifier corresponding to the resource a is valid, the resource access server provides one resource access channel connection message to the resource client, and the resource access channel connection message includes three resource access channel codes AA, BB and CC, which all correspond to the resource a; when receiving a resource access request for accessing the resource a from user A, the resource access server starts a resource access channel server; when receiving a resource access channel establishment request initiated by the resource client according to the resource access channel code AA in the resource access channel connection message, the resource access server responds to the resource access channel establishment request and establishes a resource access channel between the resource access server and the resource client to allow user A to access the resource a by means of the resource access channel. Similarly, when receiving a resource access request for accessing the resource a from user B, the resource access server responds to a resource access channel establishment request initiated by the resource client according to the resource access channel code BB in the resource access channel connection message and establishes a resource access channel between the resource access server and the resource client by means of the same resource access channel server to allow user B to access the resource a by means of the resource access channel. Similarly, when receiving a resource access request for accessing the resource a from user C, the resource access server responds to a resource access channel establishment request initiated by the resource client according to the resource access channel code CC in the resource access channel connection message and establishes a resource access channel between the resource access server and the resource client by means of the same resource access channel server to allow user C to access the resource a by means of the resource access channel. These examples are merely illustrative descriptions for a good understanding of the technical solution of the invention, and are not intended to limit the invention. Within the optional range of those skilled in the art, the number of the resource access channel connection messages in these actual applications is one or more; in the case of one resource access channel connection message, the number of the resource access channel codes is one or more. In addition, when multiple resource access channels are established, the resource access channels may be established synchronously or sequentially as needed.

In some preferred embodiments, the resource access channels are mutually isolated, such that the security is better.

In some specific implementations, the resource access channel server may be some computer programs in the resource access server, or a server having applications installed thereon (such as a cluster-type resource access server). No matter in which form, the resource access channel server is used for establishing the resource access channel between the resource access server and the resource client.

111, in response to the resource access request, access to the target resource by means of the resource access channel is allowed.

One the one hand, the processing method can save resources and has better security: the resource access channel will not be established until a valid access request for accessing the target resource is received, such that resources are neither occupied nor exposed. On the other hand, the processing method has better flexibility: the establishment of the access channel is divided into two stages: resource confirmation and channel establishment; because the establishment of the resource access channel is related to the resource access channel connection message, the resource access channel connection message is introduced at the resource confirmation stage, and one or more mutually isolated resource access channels can be established by setting the resource access channel connection message to adapt to the case of multiple resource access requests for accessing the same resource.

As a preferred implementation of this embodiment, the processing method further comprises the following step:

if the resource access request for accessing the target resource is not received, the resource access channel establishment request for accessing a resource access channel initiated by the resource client according to the resource access channel connection message will not be responded or be rejected. In this way, the resource access channel will not be established before a valid access request for accessing the target resource is received, thus guaranteeing access security. However, in actual applications, to guarantee a timely response to resource access requests of users, the following setting may be adopted: if the resource client does not receive a response to the resource access channel establishment request from the resource access server or the resource access server refuses to establish a resource access channel, the resource client periodically sends the resource access channel establishment request for establishing a resource access channel to the resource access server. For example, the resource client sends the resource access channel establishment request to the resource access server every 5 seconds until the resource access server gives a response to the resource access channel establishment request to establish a resource access channel. Of course, those skilled in the art can adjust the time interval between two adjacent resource access channel establishment requests according to actual use requirements.

As a preferred implementation of this embodiment, the processing method further comprises the following step: at the end of a resource access request session, the resource access channel is closed to release resources, which not only improves the resource utilization rate, but also ensures that the established resource access channel is used only once, thus improving the security. To guarantee the sustainability of resource access, the resource confirm request carrying the resource identifier from the resource client is sent periodically to ensure that the next access request for accessing the target resource can be implemented smoothly.

Electronic equipment may be a single device, system or facility, or multiple devices, systems or facilitates which are implemented in a distributed manner. Specifically, the electronic equipment comprises a memory and a processor which are in a communication connection, and a computer program which is stored in the memory and is able to run on the process, and when the computer program runs on the processor, the processing method mentioned above is implemented.

Figure 2:
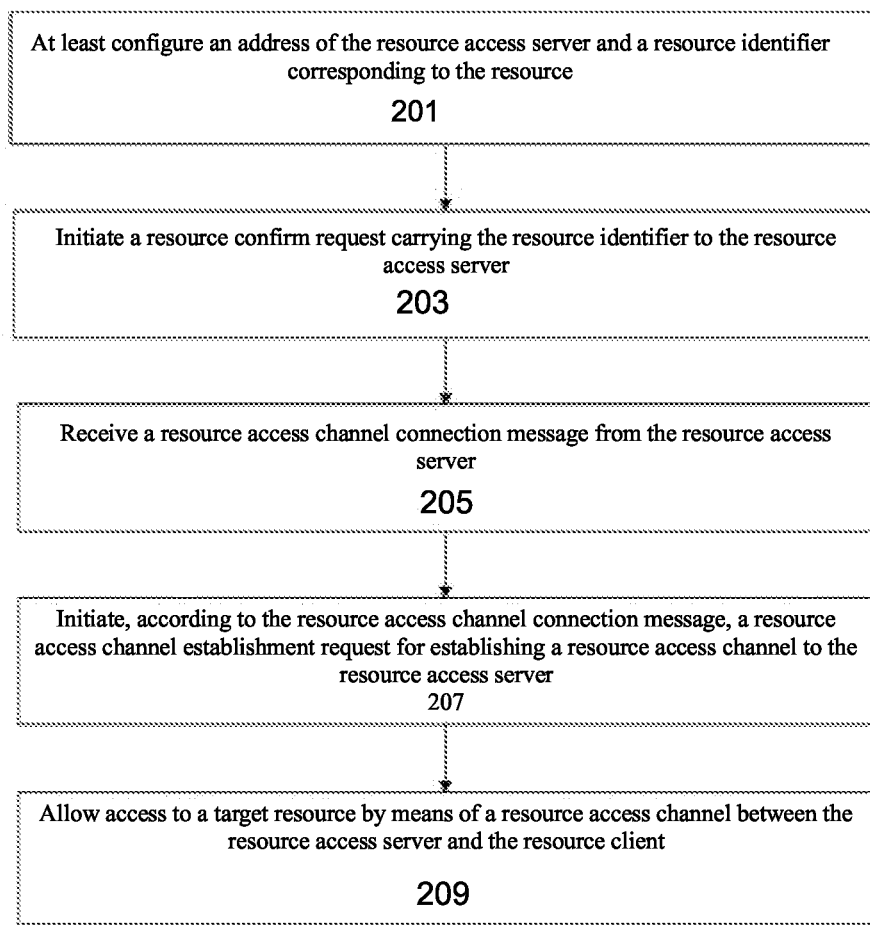
FIG. 2 is a flow diagram of another processing method for secure access according to the invention.

As shown in FIG. 2 which illustrates a processing method for secure access, the processing method is implemented by a resource client and specifically comprises the following steps:

201, at least an address of a resource access server and a resource identifier corresponding to a resource are configured for the resource client.

In some specific implementations, responses of the resource clients are manually set, and the address of the resource access server and the resource identifier corresponding to the resource are configured in the resource client. Wherein, the resource identifier is obtained by, but not limited to: feeding a resource identifier determined by the resource access server back to operators by a message or E-mail in the resource registration process.

203, a resource confirm request carrying the resource identifier is initiated to the resource access server.

Specifically, after being configured, the resource client sends a resource confirm request carrying the resource identifier to the resource access server.

In some actual applications, to guarantee the sustainability of resource access, the resource client periodically initiates the resource confirm request carrying the resource identifier to the resource access server to ensure that the next access request for accessing the target resource can be implemented smoothly.

205, a resource access channel connection message from the resource access server is received.

Specifically, after at least confirming that the resource identifier in the resource confirm request is valid, the resource access server responds to the resource confirm request to provide a resource access channel connection message to the resource client. As mentioned above, in response to one or more resource access requests, one or more resource access channel connection messages may be received by the resource client to establish one or more resource access channels to allow access to the target resource. The specific implementation is as mentioned above and will not be repeated here.

In some preferred embodiments, the resource access channel connection message is with randomness, for example, the resource access channel connection message is randomly generated or allocated by the resource access server. In this way, the resource access channel established according to the resource access channel connection message is also with randomness and can prevent reuse or damage, thus further improving the security.

S207, according to the resource access channel connection message, a resource access channel establishment request for establishing a resource access channel is initiated to the resource access server.

Specifically, the resource client initiates a resource access channel establishment request according to the resource access channel connection message to request to establish a resource access channel between the resource client and the resource access server, and the resource access server receives the resource access channel establishment request. The resource access channel is established in response to the resource access channel establishment request after the resource access server receives the resource access request for accessing the target resource.

In some actual applications, if the resource client receives multiple resource access channel connection messages, the resource client will initiate multiple resource access channel establishment requests, and each resource access channel establishment request corresponds to one resource access channel connection message; if the resource client receives only one resource access channel connection message, the resource client will initiate only one resource access channel establishment request, and the resource access channel establishment request uniquely corresponds to the resource access channel connection message; if the resource client receives one resource access channel connection message and the resource access channel connection message includes multiple resource access channel codes, the resource client will initiate multiple resource access channel establishment requests, and each resource access channel establishment request corresponds to one resource access channel code. Of course, these examples are merely illustrative descriptions and are not intended to limit the invention.

In some preferred embodiments, the resource access channels are mutually isolated, such that the security is better.

209, access to the target resource by means of the resource access channel between the resource access server and the resource client is allowed.

As a preferred implementation of this embodiment, if not receiving the resource access request for accessing the target resource, the resource access server will not respond to or will reject the resource access channel establishment request for establishing a resource access channel initiated by the resource client according to the resource access channel connection message. In this way, the resource access channel will not be established before a valid access request for accessing the target resource is received, thus guaranteeing the access security. However, in actual applications, to guarantee a timely response to resource access requests of users, the following setting is adopted: if the resource client does not receive a response to the resource access channel establishment request from the resource access server or the resource access server refuses to establish a resource access channel, the resource client periodically sends the resource access channel establishment request for establishing a resource access channel to the resource access server. For example, the resource client sends the resource access channel establishment request to the resource access server every 5 seconds until the resource access server gives a response to the resource access channel establishment request to establish a resource access channel. Of course, those skilled in the art can adjust the time interval between two adjacent resource access channel establishment requests according to actual use requirements.

Electronic equipment may be a single device, system or facility, or multiple devices, systems or facilitates which are implemented in a distributed manner. Specifically, the electronic equipment comprises a memory and a processor which are in a communication connection, and a computer program which is stored in the memory and is able to run on the process, and when the computer program runs on the processor, the processing method mentioned above is implemented.

Figure 3:
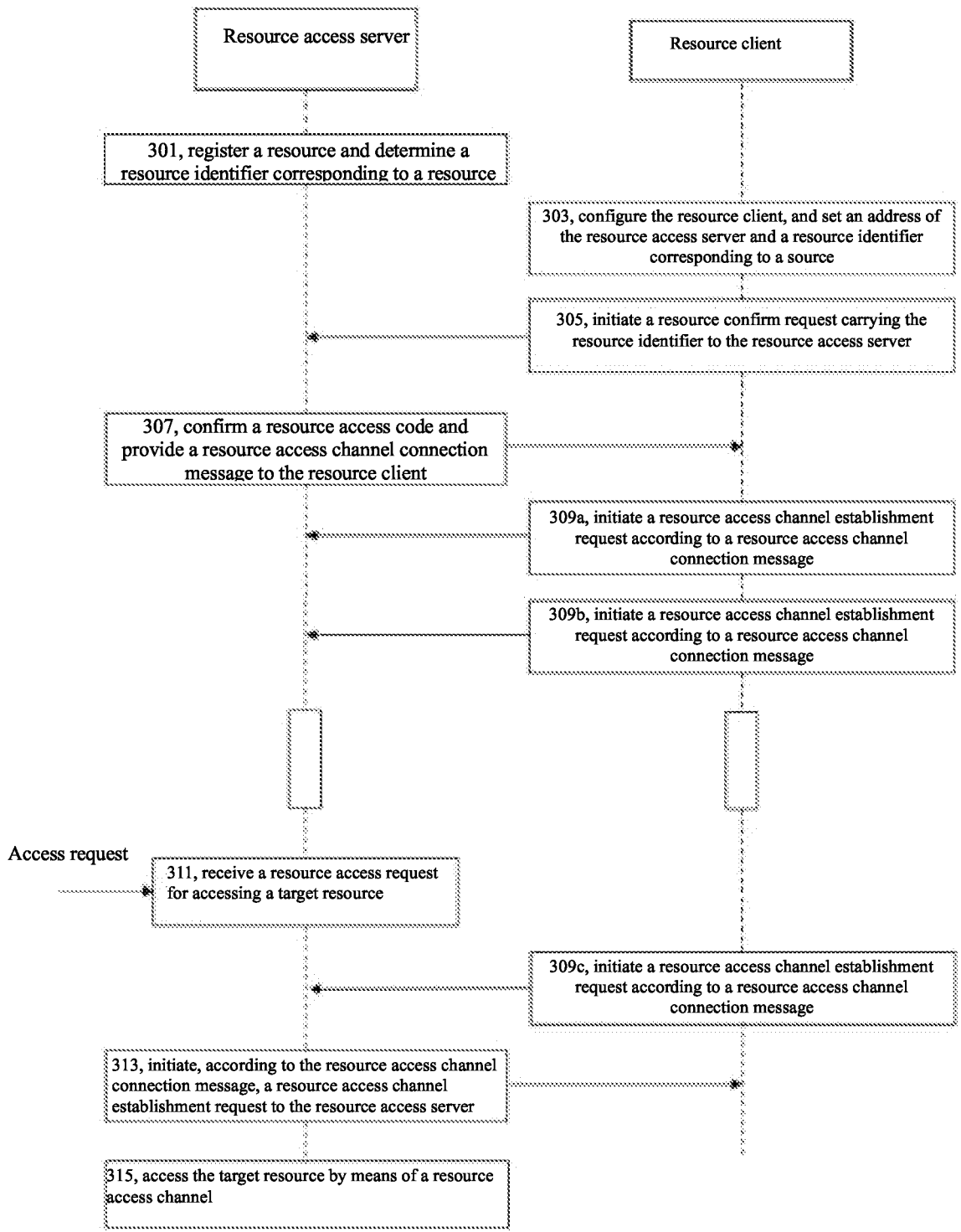
FIG. 3 is a sequence diagram of a processing method for secure access according to the invention.

As shown in FIG. 3, to clearly explain the technical solution of the invention, the processing method is described with reference of the example illustrated by FIG. 3 (this example is not intended to limit the invention). The processing method specifically comprises the following steps:

301, the resource access server registers the resource and determines a resource identifier corresponding to the resource.

The specific implementation is similar to step 101 described above and will not be repeated here.

303, the resource client is configured with at least the address of the resource access server and the resource identifier corresponding to the resource.

The specific implementation is similar to step 201 described above and will not be repeated here.

305, the resource client initiates a resource confirm request carrying the resource identifier to the resource access server.

The specific implementation is similar to step 203 described above and will not be repeated here.

307, the resource access server receives the resource confirm request carrying the resource identifier from the resource client; the resource access server at least confirms that the resource identifier is valid and responds to the resource confirm request to provide a resource access channel connection message to the resource client.

The specific implementation is similar to step 103 and step 105 described above and will not be repeated here.

309, according to the resource access channel connection message, the resource client initiates a resource access channel establishment request for establishing a resource access channel to the resource access server.

The specific implementation is similar to step 205 and step 207 described above and will not be repeated here. If not receiving a resource access request for accessing the target resource, the resource access server will not respond to or will reject the resource access channel establishment request for establishing a resource access channel initiated by the resource client according to the resource access channel connection message, and perform step 309 again a certain time later. For example, as shown in FIG. 3, 309a, when the resource client initiates a resource access channel establishment request to the resource access server according to the resource access channel connection message, if the resource access server does not receive the resource access request for accessing the target resource (the resource corresponding to the resource access channel connection message), the resource access server will not respond to or will reject the resource access channel establishment request; 309a, after a certain time later, the resource client initiates the resource access channel establishment request to the resource access server again according to the resource access channel connection message, if the resource access server still does not receive the resource access request for accessing the target resource (the resource corresponding to the resource access channel connection message), the resource access server will not respond to or will reject the resource access channel establishment request.

311, the resource access server receives the resource access request for accessing the target resource.

The specific implementation is similar to step 107 described above and will not be repeated here. If the resource access server receives the resource access channel establishment request (FIG. 309a, the specific implementation is similar to step 205 and step 207 described above) initiated by the resource client according to the resource access channel connection message (corresponding to the target resource) after receiving the resource access request for accessing the target resource, 313 is performed.

313, the resource access server responds to the resource access channel establishment request to establish a resource access channel between the resource access server and the resource client.

The specific implementation is similar to step 109 described above and will not be repeated here.

315, in response to the resource access request, access to the target resource by means of the resource access is allowed.

The specific implementation is similar to step 111 and step 209 described above and will not be repeated here.

To facilitate understanding, an example is provided below:

The resource access server is an independent server and has a server application installed thereon. The resource client is a portable computer, carries a source x and is equipped with an application capable of exchanging data with the resource access server. The address of the portable computer varies with the change of the location of users. For example, when a user uses the portable computer in the company and connects the portable computer to a network of the company, the address of the portable computer is 192.168.1.1; when the user lives in a hotel during a business travel and connects the portable computer to a network of the hotel, the address of the portable computer is 192.168.1.22. In a case where user J and user K need to access the resource x at the same time, the implementation is as follows:

The resource access server registers the resource x and determines a resource identifier of the resource as xx.

The resource client is configured with the address of the resource access server and the resource identifier xx as configuration information.

the resource client initiates a resource confirm request carrying the resource identifier xx to the resource access server.

The resource access server receives the resource confirm request carrying the resource identifier xx from the resource client; after confirming that the resource identifier xx is valid, the resource access server responds to the resource confirm request to provide resource access channel connection messages YYY and ZZZ to the resource client.

After receiving the resource access channel connection messages YYY and ZZZ, the resource client initiates, according to the resource access channel connection messages YYY and ZZZ, a resource access channel establishment request for establishing a resource access channel to the resource access server. At this moment, if having not yet received a valid access request for accessing the resource x, the resource access server will not respond to or will reject the resource access channel establishment request. If not receiving a response to the resource access channel establishment request from the resource access server or the resource access server refuses to establish a resource access channel, the resource client initiates, according to the resource access channel connection messages YYY and ZZZ, the resource access channel establishment request for establishing a resource access channel to the resource access server every a certain time (such as 5 seconds).

If receiving a valid access request for accessing the resource x from user J, the resource access server starts a resource access channel server (some computer programs in the resource access server); when receiving the resource access channel establishment request initiated to the resource access server according to the resource access channel connection message YYY, the resource access server responds to the resource access channel establishment request to establish a resource access channel between the resource access server and the resource client to allow user J to access the target resource by means of the resource access channel. Similarly, if receiving a valid access request for accessing the resource x from user K, the resource access server starts the resource access channel server (some computer programs in the resource access server); when receiving the resource access channel establishment request initiated to the resource access server according to the resource access channel connection message ZZZ, the resource access server responds to the resource access channel establishment request to establish another resource access channel to allow user K to access the target resource by means of the resource access channel. The two resource access channels may be established synchronously or sequentially. That is, in the presence of multiple resource access requests for accessing the same resource, multiple mutually isolated resource access channels can be established to allow multiple resource access requests to access the same resource by means of different resource access channels, such that the security is better.

The examples in the above implementations are used to assist in further understanding the solutions of the invention rather than limiting the technical solutions of the invention. Although the invention has been described in detail with reference to the above embodiments, those ordinarily skilled in the art should understand that amendments to the technical solutions of the above embodiments or equivalent substitutions to part of the technical features in the above embodiments can be made without making the essence of corresponding technical solutions depart from the scope of the technical solutions of the embodiments of the invention.

What is claimed is:

1. A processing method for secure access, being applied to a resource access server, wherein the resource access server is connected to one or more resources by means of a resource client, and the processing method comprises:
   registering the resource and determining a resource identifier corresponding to the resource;
   receiving a resource confirm request carrying the resource identifier from the resource client;
   at least confirming that the resource identifier is valid, and in response to the resource confirm request, providing a resource access channel connection message to the resource client, wherein the resource access channel connection message is randomly generated or allocated by the resource access server;
   receiving a resource access request of a user for accessing a target resource;
   in response to a resource access channel establishment request initiated by the resource client according to the resource access channel connection message, establishing a resource access channel between the resource access server and the resource client; and
   in response to the resource access request, allowing access to the target resource by means of the resource access channel;
   wherein if the resource client does not receive a response to the resource access channel establishment request from the resource access server or the resource access server refuses to establish a resource access channel, the resource client periodically sends the resource access channel establishment request for establishing a resource access channel to the resource access server.

2. The processing method for secure access according to claim 1, wherein the resource is a roaming resource without a fixed address or the resource does not have an externally accessible address.

3. The processing method for secure access according to claim 1, wherein the resource access channel connection message is used for establishing one or more resource access channels to respond to one or more resource access requests to allow access to the target resource.

4. The processing method for secure access according to claim 3, wherein the resource access channels are mutually isolated.

5. The processing method for secure access according to claim 1, wherein the processing method further comprises:
   if the resource access request for accessing the target resource is not received, not responding to or rejecting the resource access channel establishment request for establishing a resource access channel initiated by the resource client according to the resource access channel connection message.

6. The processing method for secure access according to claim 1, wherein the resource confirm request carrying the resource identifier from the resource client is sent periodically.

7. The processing method for secure access according to claim 1, wherein the method further comprises: checking the validity of the resource access request to determine that the user has an access right to access the target resource.

8. The processing method for secure access according to claim 1, wherein the method further comprises: closing the resource access channel at the end of a resource access request session.

9. A processing method for secure access, being applied to a resource client, wherein the resource client carries or is able to access one or more resources and is connected to a resource access server, and the processing method comprises:
   at least configuring an address of the resource access server and a resource identifier corresponding to the resource;
   initiating a resource confirm request carrying the resource identifier to the resource access server;
   receiving a resource access channel connection message from the resource access server, wherein the resource access channel connection message is randomly generated or allocated by the resource access server;
   initiating, according to the resource access channel connection message, a resource access channel establishment request for establishing a resource access channel to the resource access server; and
   allowing a user to access a target resource by means of a resource access channel between the resource access server and the resource client;
   wherein, the resource access channel connection message is provided to the resource client after the resource access server at least confirms that the resource identifier is valid; the resource access channel is established in response to the resource access channel establishment request after the resource access server receives a resource access request for accessing the target resource;
   wherein the processing method further comprises:
   if a response to the resource access channel establishment request is not received from the resource access server or the resource access server refuses to establish a resource access channel, periodically sending the resource access channel establishment request for establishing a resource access channel to the resource access server.

10. The processing method for secure access according to claim 9, wherein the resource is a roaming resource without a fixed address or the resource does not have an externally accessible address.

11. The processing method for secure access according to claim 9, wherein the resource access channel connection message is used for establishing one or more resource access channels to respond to one or more resource access requests to allow access to the target resource.

12. The processing method for secure access according to claim 11, wherein the resource access channels are mutually isolated.

13. The processing method for secure access according to claim 9, wherein the resource client periodically initiates the resource confirm request carrying the resource identifier to the resource access server.

14. The processing method for secure access according to claim 9, wherein if not receiving the resource access request for accessing the target resource, the resource access server will not respond to or will reject the resource access channel establishment request from the resource client.

15. Electronic equipment, comprising: a memory and a processor which are in communication connection, and a computer program which is stored in the memory and is able to run on the processor, wherein the processing method according to claim 1 is implemented when the computer program runs on the processor.

16. Electronic equipment, comprising: a memory and a processor which are in communication connection, and a computer program which is stored in the memory and is able to run on the processor, wherein the processing method according to claim 9 is implemented when the computer program runs on the processor.

* * * * *